United States Patent
Balmakhtar et al.

(10) Patent No.: US 11,006,391 B1
(45) Date of Patent: May 11, 2021

(54) NON-INTRUSIVE TRAFFIC ANALYSIS FOR WIRELESS NETWORKS

(71) Applicant: Sprint Spectrum LP, Overland Park, KS (US)

(72) Inventors: Marouane Balmakhtar, Fairfax, VA (US); Arun Rajagopal, Leawood, KS (US); Kafi Hassan, Fairfax, VA (US); Roger Bartlett

(73) Assignee: Sprint Spectrum L.P., Overland Park, KS (US)

( * ) Notice: Subject to any disclaimer, the term of this patent is extended or adjusted under 35 U.S.C. 154(b) by 7 days.

(21) Appl. No.: 16/015,905

(22) Filed: Jun. 22, 2018

(51) Int. Cl.
*H04L 12/26* (2006.01)
*H04W 72/04* (2009.01)
*H04W 24/02* (2009.01)
*H04L 12/24* (2006.01)
*H04W 24/00* (2009.01)
*H04W 24/08* (2009.01)

(52) U.S. Cl.
CPC .......... *H04W 72/04* (2013.01); *H04L 43/028* (2013.01); *H04L 43/08* (2013.01); *H04W 24/02* (2013.01); *H04L 41/083* (2013.01); *H04L 41/5009* (2013.01); *H04L 43/04* (2013.01); *H04W 24/00* (2013.01); *H04W 24/08* (2013.01)

(58) Field of Classification Search
CPC ..... H04L 43/08; H04L 43/0876; H04L 43/16; H04L 45/00; H04L 47/00; H04L 41/5009; H04L 41/083; H04L 43/04; H04W 72/048; H04W 72/042; H04W 72/0446; H04W 72/1242; H04W 24/08; H04W 24/00; H04W 24/02
See application file for complete search history.

(56) References Cited

U.S. PATENT DOCUMENTS

| | | | |
|---|---|---|---|
| 9,585,054 | B2 | 2/2017 | Ahmad et al. |
| 2013/0272301 | A1* | 10/2013 | Gopshtein ............. H04L 47/193 370/389 |
| 2015/0264512 | A1* | 9/2015 | Jain ........................ H04W 4/70 370/328 |
| 2015/0333986 | A1 | 11/2015 | Pang et al. |
| 2017/0079059 | A1* | 3/2017 | Li ........................ H04W 16/02 |
| 2017/0214790 | A1* | 7/2017 | Sun ..................... H04M 3/2218 |
| 2018/0184412 | A1* | 6/2018 | Youtz .................. H04W 72/048 |
| 2018/0255175 | A1* | 9/2018 | Tran .................... H04L 65/1069 |

* cited by examiner

*Primary Examiner* — Jae Y Lee
*Assistant Examiner* — Aixa A Guadalupe Cruz (57) ABSTRACT

Systems, methods, and processing nodes for obtaining radio network characteristics associated with network traffic, determining a type of network traffic and/or network session, allocating resources towards a network traffic session based on the type thereof (or type of network traffic), and performing additional network optimization operations based thereon, including but not limited to metering, billing, and service adjustments such as reallocation of resources. Consequently, resource usage patterns of different data types can be made predictable to a network operator, enabling optimal allocation of network resources, adjustments of latency, and thus providing an optimal user experience.

16 Claims, 5 Drawing Sheets

NON-INTRUSIVE TRAFFIC ANALYSIS FOR WIRELESS NETWORKS

TECHNICAL BACKGROUND

Wireless networks are becoming increasingly common. Wireless networks deploying different types of access points or access nodes, and utilizing different communication technologies (such as LTE, Wi-Fi, etc.) may be referred to as heterogeneous networks. Further, network traffic across these different types of communication technologies (including but not limited to data packets) may also be encoded differently, transmitted using different protocols, or have different requirements for usage of radio resources. Awareness of the content and/or application associated with different types of network traffic is therefore useful to allocate radio resources appropriately for the different types of network traffic. However, existing methods of determining types of network traffic, such as deep packet inspection or parsing headers or other indicators may be inefficient and/or intrusive, as well as difficult if the traffic is encrypted or otherwise encoded using some proprietary mechanism.

OVERVIEW

Exemplary embodiments described herein include systems, methods, and processing nodes for obtaining radio network characteristics associated with network traffic, determining a type of network traffic and/or network session, allocating resources towards a network traffic session based on the type thereof (or type of network traffic), and performing additional network optimization operations based thereon, including but not limited to metering, billing, and service adjustments such as reallocation of resources. Consequently, resource usage patterns of different data types can be made predictable to a network operator, enabling optimal allocation of network resources, adjustments of latency, and thus providing an optimal user experience. Further, the disclosed operations are less resource-intensive than prior-art methods, thereby improving the field of computer network development.

An exemplary system described herein for non-intrusive traffic analysis comprises a processing node and a processor coupled to the processing node, the processor for enabling the processing node to perform operations comprising obtaining radio network characteristics associated with a network traffic session between a wireless device and an access node communicably coupled to the processing node, determining a type of network traffic session based on patterns in the radio network characteristics, and optimizing resource allocation towards the network traffic session based on the type.

An exemplary method described herein for non-intrusive traffic analysis comprises determining, at an access node, an existence of a network traffic session between the access node and a wireless device coupled to the access node, obtaining, by the access node, radio network characteristics associated with the network traffic session, determining, by the access node, one or more patterns in the radio network characteristics, matching, by the access node, the one or more patterns with known types of network traffic sessions to determine a type of the network traffic session, and performing one or more optimization actions for the wireless device based on the type of network traffic session.

An exemplary processing node described herein for non-intrusive traffic analysis is configured to perform operations comprising monitoring a plurality of radio network characteristics associated with a network traffic session between an access node and a wireless device, and determining a type of network traffic session based on the monitored plurality of radio network characteristics. The plurality of radio network characteristics are monitored using non-intrusive means, i.e. without observing a packet type or packet header of data packets within the network traffic session.

DETAILED DESCRIPTION

Exemplary embodiments described herein include systems, methods, and processing nodes for obtaining radio network characteristics associated with network traffic, determining a type of network traffic and/or network session, allocating resources towards a network traffic session based on the type thereof (or type of network traffic), and performing additional network optimization operations based thereon, including but not limited to metering, billing, and service adjustments such as reallocation of resources. Obtaining radio network characteristics comprises monitoring resource characteristics such as resource allocation type, resource scheduling, modulation and coding schemes (MCS), code rate, transport block, buffer sizes, network addresses, power levels, as well as flow characteristics such as burstiness, time duration of bursts, size of bursts, direction of flow, etc. Based thereon, patterns may be determined, and associated with known types of network traffic sessions, including but not limited to web browsing, audio/video streaming, VoIP, download, upload, and so on.

The patterns may be based on radio network characteristics obtained over configurable time intervals, such as 15-30 seconds, and matched with the known types of network traffic session information stored on an access node or elsewhere on the wireless network. Pattern matching may be performed in one or both of an uplink and a downlink direction. Upon determining a type of network traffic session, additional actions may be performed, including optimal allocation of network resources, adjustments of latency, adjustment of Quality of Service (QoS) and Service Level Agreements (SLAs), and can be used in network deployment. Further, patterns may be learned based on near-real-time analysis as performed herein, and a granularity of monitoring as well as performance of actions may be adjusted from a network-wide level to a local level (i.e. at a specific access node). Such scalable fine tuning of traffic and resource optimization thus provides an optimal user experience that is an improvement over prior methods such as deep packet inspection and parsing of packet headers, which may be more resource-intensive. For example, determining if a particular session is a Voice over LTE (VoLTE) session generally requires an excessive amount of signaling, which can consume network resources. In contrast, the disclosed embodiments minimize or eliminate the need for excessive signaling, using non-intrusive means for monitoring for various patterns associated with VoLTE traffic.

Further, in addition to the systems and methods described herein, these operations may be implemented as computer-readable instructions or methods, and processing nodes on the network for executing the instructions or methods. For example, a processing node coupled to a relay access node, a scheduler within the relay or donor access nodes, or a gateway or controller node, may be configured to perform the operations described herein. These and other embodiments are further described with reference to FIGS. 1-5 below.

Figure 1:
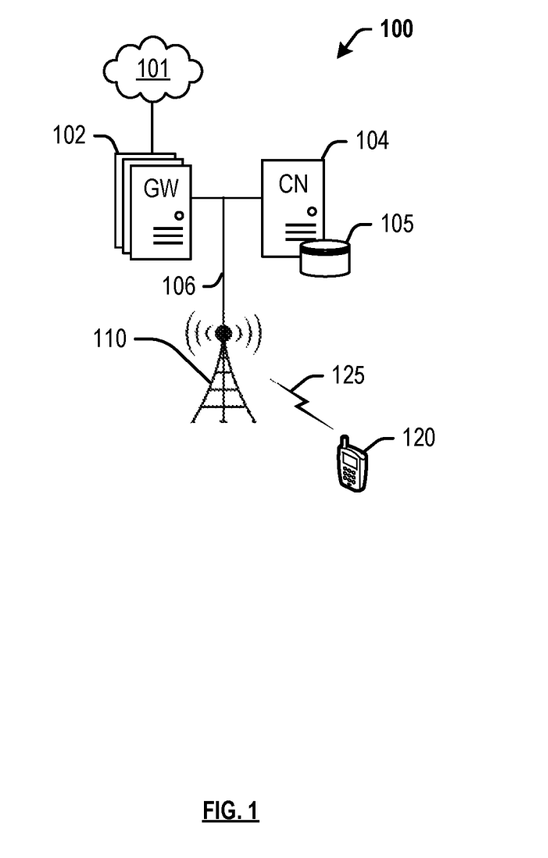
FIG. 1 depicts an exemplary system for non-intrusive traffic analysis.

FIG. 1 depicts an exemplary system 100 for non-intrusive traffic analysis in a wireless network. System 100 comprises a communication network 101, gateway node(s) 102, controller node 104, access node 110, and wireless device 120. In other embodiments, any other combination of access nodes and wireless devices may be evident to those having ordinary skill in the art in light of this disclosure. In this exemplary embodiment, access node 110 may be a macro-cell access node configured to deploy a wireless air-interface wireless device 120 can attach, and send and receive data via communication link 125. The data may be sent to and received from any network node such as, for example, a network node on network 101. Further, the may comprise a protocol data unit (PDU), such as a data packet or similar unit of data, and may be sent and received using a network traffic session on communication link 125, as further described herein.

In this exemplary embodiment, access node 110 may be configured to obtain radio network characteristics associated with network traffic transmitted across communication link 125, determine a type of network traffic and/or network session, allocate resources towards the network traffic session based on the type thereof (or type of network traffic), and perform additional network optimization operations based thereon, including but not limited to metering, billing, and service adjustments for wireless device 120. Obtaining radio network characteristics comprises monitoring resource characteristics of communication link 125, including resource allocation type, resource scheduling, modulation and coding schemes (MCS), code rate, transport block, buffer sizes, network addresses, power levels, as well as flow characteristics of data traffic transmitted on communication link 125, such as burstiness, time duration of bursts, size of bursts, direction of flow, etc.

Based thereon, access node 110 may determine patterns, and match the patterns with known types of network traffic sessions, including but not limited to web browsing, audio/video streaming, VoIP, download, upload, and so on. The patterns may be based on radio network characteristics obtained over configurable time intervals, and matched with the known types of network traffic session information stored on access node 110 or elsewhere on the wireless network, such as database 105 coupled to controller node 104. Time intervals for determining a pattern may be 30-60 seconds, every few minutes, or based on some other trigger such as threshold volume of data being throughput, or upon a load level meeting a threshold. Further, pattern matching may be performed in one or both of an uplink and a downlink direction. For example, the radio network and flow characteristics mentioned herein may be obtained for both uplink data sessions and downlink data sessions. In other words, a pattern may comprise any combination of uplink and downlink characteristics. Further, patterns may be validated based on known patterns or patterns measured specifically to build knowledge of associations with different types of traffic prior to measuring new sessions and/or predicting usage by new wireless devices.

Upon determining a type of network traffic session, access node 110 (or any other network node) may be configured to perform additional actions so as to optimize resource usage of system 100 and to provide an acceptable user experience for a user of wireless device 120. For example, network resource allocation may be adjusted based on the type of session. Further, latency, Quality of Service (QoS) and Service Level Agreements (SLAs), may be modified based on usage. Metering and billing operations can be performed based on knowing the types of sessions associated with wireless device 120. Network deployment or planning may also be based on such usage patterns and session types. These patterns may be learned based on near-real-time analysis as performed herein, and a granularity of monitoring as well as performance of optimization may be adjusted from a network-wide level to a local level (i.e. at a specific access node). Such scalable fine tuning of traffic and resource optimization thus provides an optimal user experience that is an improvement over prior methods such as deep packet inspection and parsing of packet headers, which may be more resource-intensive Access node 110 can be any network node configured to provide communication between wireless device 120 and communication network 101, including standard access nodes such as a macro-cell access node, base transceiver station, a radio base station, an eNodeB device, an enhanced eNodeB device, or the like. In an exemplary embodiment, a macro-cell access node 110 can have a coverage area in the range of approximately five kilometers to thirty-five kilometers and an output power in the tens of watts. Alternatively, access node 110 may comprise any short range, low power, small-cell access nodes such as a microcell access node, a picocell access node, a femtocell access node, or a home eNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with other access nodes (not shown), using wired or wireless links, such as X2 links. Components of exemplary access nodes (and processing nodes coupled thereto) are further described with reference to FIGS. 2-3.

Wireless device 120 may be any device, system, combination of devices, or other such communication platform capable of communicating wirelessly with access node 110 using one or more frequency bands deployed therefrom. Wireless devices 120 may comprise, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless device 120. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link.

Gateway node(s) 102 can be any network node configured to interface with other network nodes using various protocols. Gateway node(s) 102 can communicate user data over system 100. Gateway node(s) 102 can be standalone computing devices, computing systems, or network components, and can be accessible, for example, by a wired or wireless connection, or through an indirect connection such as through a computer network or communication network. For example, gateway node(s) 102 can include a serving gateway (S-GW) and/or a public data network gateway (P-GW), etc. One of ordinary skill in the art would recognize that gateway node(s) 102 are not limited to any specific technology architecture, such as Long Term Evolution (LTE) and can be used with any network architecture and/or protocol.

Each of gateway node(s) 102 can comprise a processor and associated circuitry to execute or direct the execution of computer-readable instructions to obtain information. Gateway node(s) 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node(s) 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing associations between radio network and data flow patterns and types of network traffic sessions, as well as configurations and capabilities of access node 110, wireless device 120, external and internal network addresses of network nodes and devices, signal conditions of access node 110, and so on. This information may be requested by or shared with gateway node(s) 102 and/or access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described herein may be implemented with, contain, or be executed by one or more computer systems and/or processing nodes. The methods described herein may also be stored on a non-transitory computer readable medium. Many of the elements of system 100 may be, comprise, or include computers systems and/or processing nodes. This includes, but is not limited to: gateway node(s) 102, controller node 104, access node 110, and/or network 101.

Figure 2:
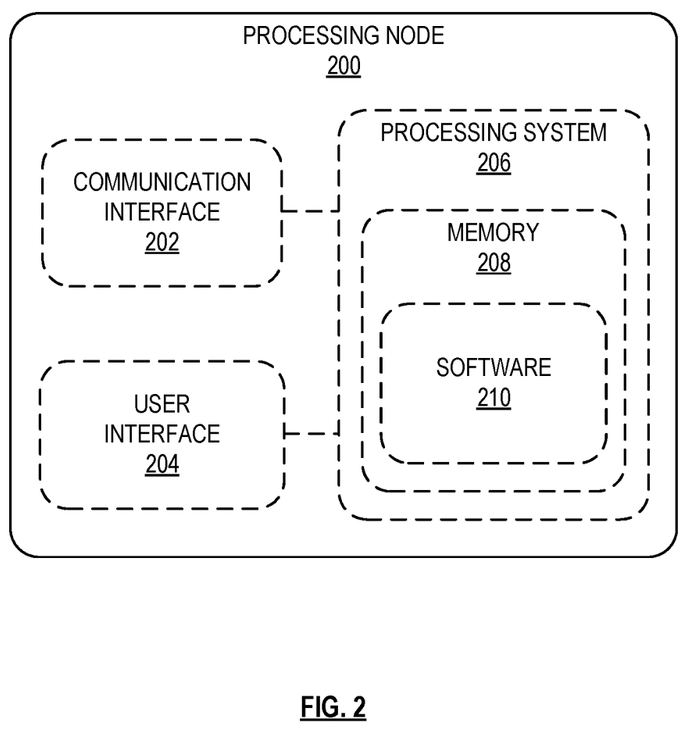
FIG. 2 depicts an exemplary processing node for non-intrusive traffic analysis.

FIG. 2 depicts an exemplary processing node for performing non-intrusive traffic analysis in a wireless network. Processing node 200 comprises a communication interface 202, user interface 204, and processing system 206 in communication with communication interface 202 and user interface 204. Processing system 206 includes storage 208, which can comprise a disk drive, flash drive, memory circuitry, or other memory device. Storage 208 can store software 210 which is used in the operation of the processing node 200. Storage 208 may include a disk drive, flash drive, data storage circuitry, or some other memory apparatus. For example, storage 208 may include a buffer. Software 210 may include computer programs, firmware, or some other form of machine-readable instructions, including an operating system, utilities, drivers, network interfaces, applications, or some other type of software. For example, software 210 may include a module for performing non-intrusive analysis of network traffic, as well as modules for interfacing with various network elements for obtaining transmission and flow characteristics described herein. Processing system 206 may include a microprocessor and other circuitry to retrieve and execute software 210 from storage 208. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Figure 3:
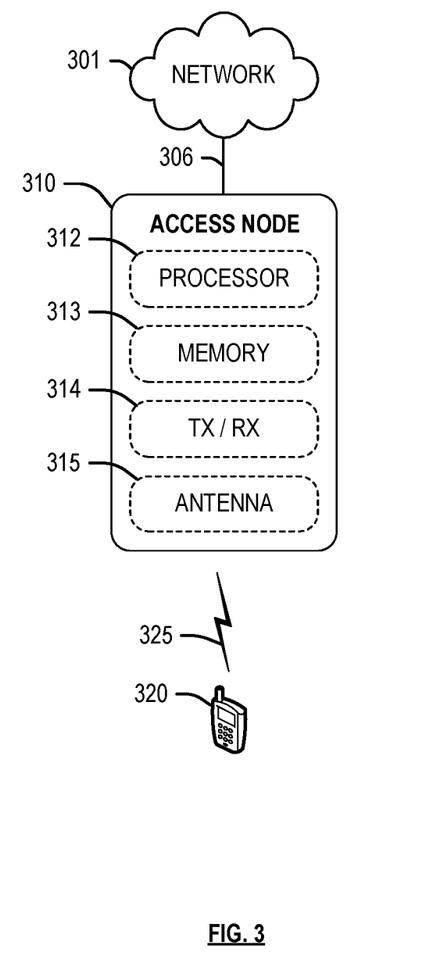
FIG. 3 depicts an exemplary access node for non-intrusive traffic analysis.

FIG. 3 depicts an exemplary access node 310 for performing non-intrusive traffic analysis. Access node 310 may comprise, for example, a macro-cell access node, such as access node 110 described with reference to FIG. 1. Access node 310 is illustrated as comprising a processor 312, memory 313, transceiver 314, and antenna 315. Processor 312 executes instructions stored on memory 313, while transceiver 314 and antenna 315 enable wireless communication with wireless device 320 over wireless communication session 325. Instructions stored on memory 313 can include deploying an air-interface carrier to which wireless device 320 can attach to access network services directly. Access node 310 may further be configured to perform operations comprising obtaining radio network characteristics associated with network traffic, determining a type of network traffic and/or network session, allocating resources towards a network traffic session based on the type thereof (or type of network traffic), and performing additional network optimization operations based thereon, including but not limited to metering, billing, and service adjustments such as reallocation of resources, as further described herein.

Figure 4:
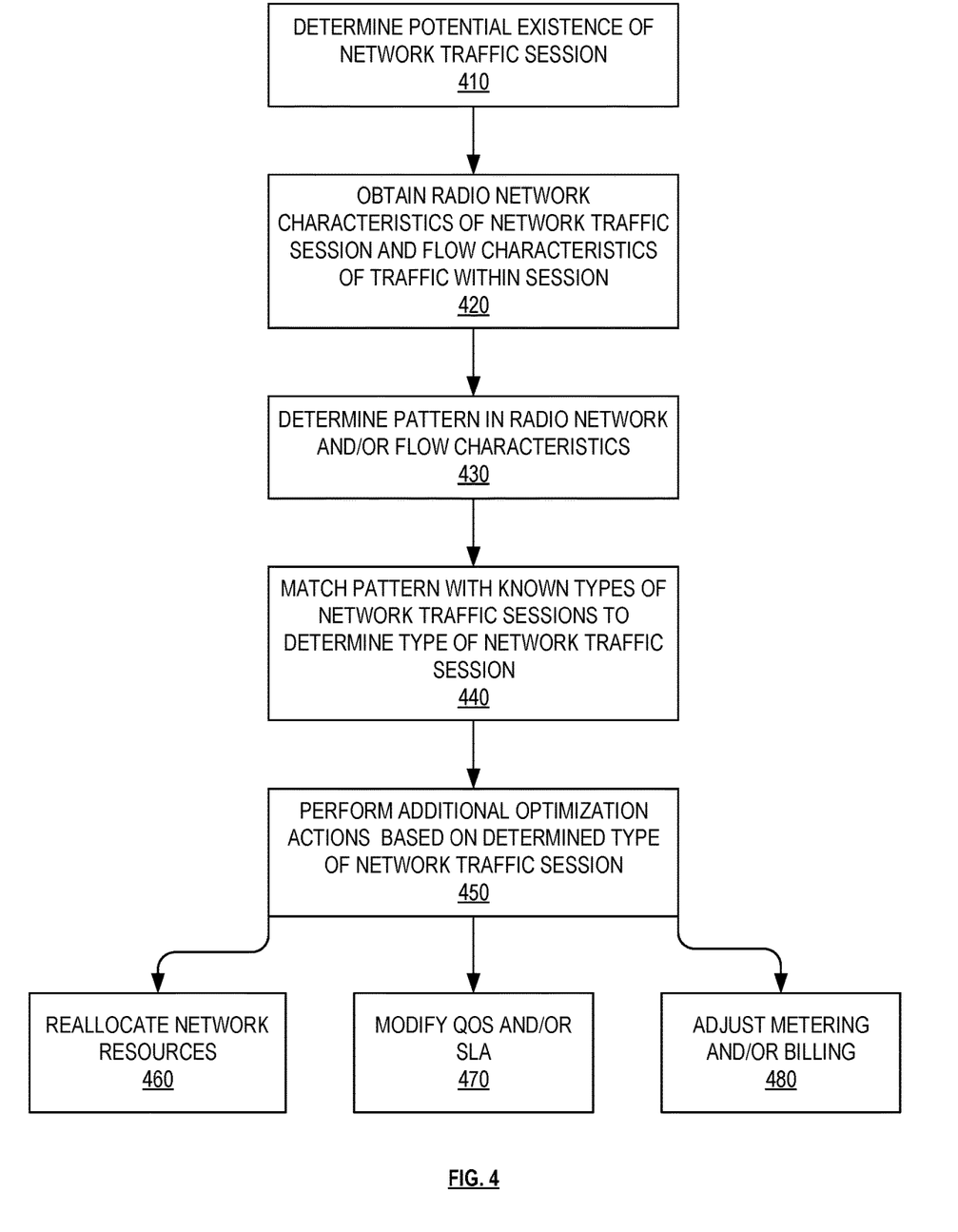
FIG. 4 depicts an exemplary method for non-intrusive traffic analysis.

FIG. 4 depicts an exemplary method for performing non-intrusive traffic analysis in a wireless network. The exemplary method of FIG. 4 may be implemented using components similar to those depicted in system 100, such as a network 101, gateway(s) 102, access node 110, wireless device 120. Although FIG. 4 depicts operations performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 410, a potential existence of a network traffic session is determined. This operation may be triggered by one or more of several factors, including granting a connection request from a wireless device attempting to attach to an access node, granting resources to the wireless device, receiving network traffic from an external network node and addressed to the wireless device, creating a virtual bearer or "tunnel" for data traffic to and from the wireless device, execution of an application on the wireless device, and so on. In an exemplary embodiment, a potential existence of a network traffic session may be determined based on a threshold amount of data transmitted to/from the wireless device.

At 420, radio network characteristics are obtained for the network session, and flow characteristics of data traffic within the network session are monitored. Obtaining radio network characteristics comprises monitoring resource characteristics such as resource allocation type, resource scheduling, modulation and coding schemes (MCS), code rate, transport block, buffer sizes, network addresses, power levels, as well as flow characteristics such as burstiness, time duration of bursts, size of bursts, direction of flow, etc. As described herein, this information can be passively monitored by modules within an access node, or anywhere on the network, without having to perform deep packet inspection or inspect packets. In other words, resource usage and flow characteristics may be observed without impacting the traffic itself At 430, patterns may be determined within the network and/or flow characteristics. Patterns may comprise numerous specific patterns in each type of characteristic. For example, a pattern may comprise a simultaneous reception of a large amount of data in a downlink direction along with a very small amount of data in an uplink direction, for a specified period of time, such as a few seconds. Then, at 440, patterns are matched with known types of network traffic sessions, in order to determine a type of network traffic session engaged in by a user of the wireless device. For example, the large downlink and simultaneously small uplink pattern may correspond to a web browsing session on the wireless device. Further, Table 1 below illustrates additional types of network traffic sessions and patterns associated therewith.

TABLE 1

| Traffic Type | Flow Description |
| --- | --- |
| Voice | Packet size less than 100 bytes, bi-directional, frequent pauses in either direction, relatively steady spurts of data with longer pauses in-between |
| Video download/ streaming | Large packet sizes ~1500 bytes, unidirectional, frequent bit-rate changes, steady flow of packets |
| Web Browsing | Short, low bit-rate uplink (HTTP/HTTPS GET), larger downloads for the web content to be delivered, short duration, little upload traffic |
| Interactive online gaming | Long duration, small uplink packet sizes, larger packets (larger than upload packet sizes) coming down to the UE (mean packet size above 400 bytes), steady traffic both directions |
| Audio streaming | Low bit rate, continuous stream, unidirectional |
| ICMP traffic | Bi-directions, low latency. Packet size of 32 B for windows based OS and 64 B for Unix/Linux based OS. |

Subsequently at 450, upon determining a type of network traffic session, additional actions may be performed to optimize the network and/or user experience, including reallocation of network resources at 460 such as transmit power, latency, etc., adjustment of Quality of Service (QoS)

and Service Level Agreements (SLAs) at 470, and/or adjustment of billing and/or metering for optimized revenue generation at 480. Further, patterns may be learned based on near-real-time analysis as performed herein, and a granularity of obtaining characteristics 420 and performance of actions 450 may be performed from a network-wide level to a local level (i.e. at a specific access node). Such scalable fine tuning of traffic and resource optimization thus provides an optimal user experience that is an improvement over prior methods such as deep packet inspection and parsing of packet headers, which may be more resource-intensive.

Figure 5:
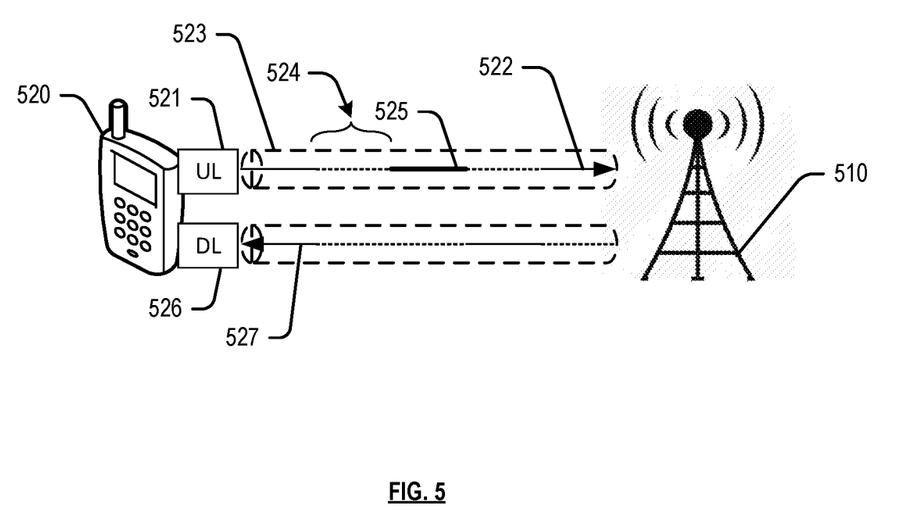
FIG. 5 depicts exemplary radio network characteristics that are used to perform non-intrusive traffic analysis.

FIG. 5 depicts exemplary radio network characteristics that are used to perform non-intrusive traffic analysis. FIG. 5 depicts wireless device 520 engaged in a network traffic session with access node 510. Wireless device 520 and access node 510 may be similar in function and type to wireless device 120 and access node 110 in FIG. 1. Further, wireless device 520 comprises an uplink buffer 521 associated with an uplink transmission 522, and a downlink buffer 526 associated with a downlink transmission 527. Thus, monitoring or obtaining network and flow characteristics associated with transmissions between wireless device 520 and access node 510 include at least monitoring radio resources allocated for an uplink bearer 523 for transporting uplink data 522, as well as a time length 524 of bursts within uplink transmission 522, an amount or size 525 of bursts within uplink transmission 522, and a size or usage of uplink buffer 521. Further, resource characteristics such as QoS, MCS, and error rate may be monitored for bearer 523. The same characteristics may also be monitored for downlink transmission 527. Patterns in these characteristics are used to identify a type of session, as described above.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A system for performing non-intrusive traffic analysis in a wireless network, the system comprising:
   a processing node; and
   a processor coupled to the processing node, the processor for enabling the processing node to perform operations comprising:
   obtaining radio network characteristics associated with a network traffic session between a wireless device and an access node communicably coupled to the processing node, the radio network characteristics comprising at least a packet size, a direction of flow, and a burstiness;
   monitoring the radio network characteristics for a pattern;
   matching the pattern with a known pattern associated with one or more types of network traffic sessions;
   based on the matching, determining a type of the network traffic session; and
   optimizing resource allocation towards the network traffic session based on the type,
   wherein the pattern comprises a packet size of less than 100 bytes, a bi-directional transmission, frequent pauses in the bi-direction transmission, and steady bursts of packets with longer pauses, and
   wherein the pattern is matched to a voice type network traffic session.

2. The system of claim 1, wherein the operations further comprise determining an existence of the network traffic session.

3. The system of claim 2, wherein determining the existence of the network traffic session is based on one or more of: a grant of a connection request from the wireless device, a grant of resources to the wireless device, an incoming data packet received at the access node and addressed to the wireless device, creation of a virtual bearer associated with the wireless device, or execution of an application on the wireless device.

4. The system of claim 2, wherein determining the existence of the network traffic session is triggered by a transfer of a threshold amount of data to or from the wireless device.

5. The system of claim 1, wherein the radio network characteristics further comprise one or more of an amount of resources requested by the wireless device, an amount of resources granted to the wireless device, a type of resource, a modulation and coding scheme, a code rate, a transport block size, a buffer size, a source or destination network address, a transmit power level, a time duration of bursts, or a size of bursts.

6. The system of claim 1, wherein the monitoring is performed for a time duration.

7. The system of claim 6, wherein the time duration is between 15 and 30 seconds.

8. The system of claim 1, further comprising determining the known pattern from prior known network traffic sessions.

9. The system of claim 1, wherein the pattern is determined for one or both of an uplink transmission or a downlink transmission.

10. The system of claim 1, wherein optimizing resource allocation for the network traffic session comprises adjusting a latency associated with the network traffic session, adjusting a Quality of Service (QoS) for the wireless device, adjusting a Service Level Agreement (SLA) for the wireless device.

11. The system of claim 10, wherein the operations further comprise adjusting a metering and a billing cycle for the wireless device based on the resource allocation.

12. A method for performing non-intrusive traffic analysis in a wireless network, the method comprising:
- determining, at an access node, an existence of a network traffic session between the access node and a wireless device coupled to the access node;
- obtaining, by the access node, radio network characteristics associated with the network traffic session, the radio network characteristics comprising at least a packet size, a direction of flow, and a burstiness;
- determining, by the access node, one or more patterns in the radio network characteristics;
- matching, by the access node, the one or more patterns with known types of network traffic sessions to determine a type of the network traffic session; and
- performing one or more optimization actions for the wireless device based on the type of network traffic session,
- wherein the one or more patterns comprise a packet size exceeding 1500 bytes, a unidirectional transmission, frequent bit-rate changes, a steady flow of packets, and
- wherein the pattern is matched to a multimedia download or streaming type of network traffic session.

13. The method of claim 12, wherein the one or more optimization actions further comprises optimizing resource allocation towards the network traffic session based on the type.

14. The method of claim 12, wherein the one or more optimization actions further comprises adjusting one or more of a latency associated with the network traffic session, a Quality of Service (QoS) for the wireless device, or a Service Level Agreement (SLA) for the wireless device.

15. A processing node for performing non-intrusive traffic analysis in a wireless network, the processing node being configured to perform operations comprising:
- monitoring a plurality of radio network characteristics associated with a network traffic session between an access node and a wireless device, the plurality of radio network characteristics comprising at least a packet size, a direction of flow, and a burstiness;
- determining a pattern in the plurality of radio network characteristics;
- matching the pattern with a known pattern associated with one or more network traffic sessions; and
- based on the matching, determining a type of the network traffic session, wherein the plurality of radio network characteristics is monitored using non-intrusive means,
- wherein the pattern comprises a packet size exceeding 1500 bytes, a unidirectional transmission, frequent bit-rate changes, a steady flow of packets, and
- wherein the pattern is matched to a multimedia download or streaming type of network traffic session.

16. The processing node of claim 15, wherein the non-intrusive means comprises obtaining resource characteristics and flow characteristics of the network traffic session without observing a packet type or packet header of data packets within the network traffic session.

* * * * *